United States Patent [19]

Cooper et al.

[11] Patent Number: 5,053,908
[45] Date of Patent: Oct. 1, 1991

[54] PSC MOTOR START SYSTEM

[75] Inventors: Lawrence E. Cooper; Richard L. Jenne, both of Attleboro, Mass.

[73] Assignee: Texas Instruments Incorporated, Dallas, Tex.

[21] Appl. No.: 442,802

[22] Filed: Nov. 29, 1989

[51] Int. Cl.$^5$ ............................ H02H 5/04; H02P 1/44
[52] U.S. Cl. ....................................... 361/24; 318/783; 361/26
[58] Field of Search ................ 361/23, 24, 26, 27, 361/32, 34; 318/783, 430

[56]  References Cited

U.S. PATENT DOCUMENTS 4,161,681  7/1979  Rathje .................................. 318/783

Primary Examiner—Todd E. DeBoer
Attorney, Agent, or Firm—John A. Haug; James P. McAndrews; Melvin Sharp

[57] ABSTRACT

A motor winding system having a main winding and a start winding circuit with a start winding and a PTC resistor in series therewith wherein the resistor is electrically removed from the circuit at a predetermined time after motor starting and remains in this state until motor shut off. The start winding circuit also includes a bimetallic switch in series with the resistor and a series circuit of a capacitor and an electromagnet in parallel with the resistor and switch. At motor start up, current from the main power source is applied across the main winding and the start winding circuit heats up the resistor and causes an increase in the resistance thereof. Also, current through the switch and PTC heat causes the bimetallic element to snap or move when it has reached a predetermined temperature to open the start winding circuit. Meanwhile, low current passes through the capacitor and electromagnet winding, energizing the electromagnet and causing the bimetallic element to be attracted and latched to the electromagnet after predetermined movement.

28 Claims, 1 Drawing Sheet

PSC MOTOR START SYSTEM

BACKGROUND OF THE INVENTION

1. Field of the Invention

This invention relates to motors having an auxiliary start/capacitor run winding and, more specifically to a system for removal of the PTC motor starter from the circuit during motor operation.

2. Brief Description of the Prior Art

Permanent split capacitor (PSC) electric motors are generally provided with a stator winding circuit which includes a main or run winding and an auxiliary or start winding connected in series with a run capacitor which are both connected in parallel with the main winding. During motor starting and running, both the main winding and the start winding are connected across the motor power source to magnetically excite the rotor and cause rotation thereof. Sometimes a low resistance positive temperature coefficient (PTC) resistor starter is placed in parallel with the run capacitor to increase the starting torque of the motor. When the motor has reached a predetermined speed or after a predetermined time, it is advantageous to disconnect the PTC starter from the circuit to save the energy wasted keeping the PTC hot in its high resistance off state.

In some of the older prior art, the start winding was removed from the circuit by some mechanical speed related device. More recent art, as exemplified, for example by Rathje U.S. Pat. No. 4,161,681 and DeFilippis et al. U.S. Pat. No. 4,706,152 minimized the effect of the start winding by placing a resistor in series with the start winding having a positive temperature coefficient of resistance. The PTC resistor self heats due to current therethrough, this heat causing an increase in the resistance thereof, thereby causing a gradual decrease in the current through the start winding to that current primarily through the run capacitor with continued motor operation. The resistor is designed to reach a predetermined maximum resistance in a predetermined time period which is related to the motor design.

A problem with such PTC resistor controlled start windings is that the current through the PTC resistor is never completely terminated and wastes energy. This is readily apparent from the fact that, if current were completely cut off, the PTC resistor would start to cool off, thereby causing a decrease in its resistance and an increase in the current therethrough. It follows that an equilibrium low current through the PTC resistor is established during standard motor operation and after the initial start. This continual current through the PTC resistor causes unnecessary heating in the PTC resistor as well as undesirable power dissipation with concomitant loss of motor system efficiency.

SUMMARY OF THE INVENTION

In accordance with the present invention, the above noted deficiencies of the prior art are minimized and there is provided a motor winding system having a start winding with a PTC resistor in series therewith wherein PTC resistor is electrically removed from the circuit at a predetermined time after motor starting, the PTC resistor remaining out of the circuit until motor shut off.

Briefly, there is provided a motor having a main winding and a start winding circuit in parallel therewith, the start winding circuit including the start winding which is serially connected to the PTC resistor and a bimetallic switch. In addition, a series circuit of a capacitor and an electromagnet are connected in parallel with the PTC resistor and the bimetallic switch element.

In operation, at motor start up, current from the main power source is applied across the main winding and the start winding circuit. The current in the start winding circuit heats up the PTC resistor and causes an increase in the resistance thereof. In addition, the current through the bimetallic switch element and the PTC heat causes this switch element to snap or move when it has reached a predetermined temperature to open PTC circuit after it has heated to a high resistance state.

Meanwhile, current of much smaller level than is required by the start winding during normal motor starting passes through the capacitor and electromagnet winding, energizing the electromagnet and causing the bimetallic switch element to be held attracted to the electromagnet. In this way, after cool down of the bimetallic element, it will not return to the closed switch condition. This results in the PTC resistor being completely removed from the circuit and carrying no current therethrough.

The bimetallic switch element remains in the switch open condition until current is removed from the electromagnet, this taking place only at motor shut off with removal of power from the motor windings. Though relays have been used where the relay coil is in series with the main winding and the relay contacts are in series with the PTC to deenergize the PTC at a predetermined main winding current which is related to motor speed, it is preferable not to use main winding current because different current levels are required for different motor sizes. The current flowing through the capacitor and electromagnetic winding is essentially controlled by the value of the capacitor. This capacitor value is typically one or two fixed values for many sizes of refrigerator compressor motor and therefore makes it advantageous to use the capacitor run current to hold open the PTC versus the main winding current because one or two ratings can be used on the majority of PSC motor driven refrigerator compressors.

In accordance with a second embodiment of the invention, the bimetallic switch element is replaced by a non-thermostatic switch element, which is multimetallic, monometallic or multipiece, in a low power motor starter which is movable and can be opened in response to the magnetic field of the electromagnet or relay coil. The non-thermostatic switch element can be, for example, a good electrical conductor to minimize power loss and a magnetic material responsive to the magnetic field of the electromagnet or relay coil, and may be any metal, alone, as mixtures, as alloys or as assembled combinations of metals, mixtures or alloys. In this embodiment, the electromagnet opens the switch contacts as the PTC element current decreases and the capacitor current increases.

DESCRIPTION OF THE PREFERRED EMBODIMENT

Figure 1:
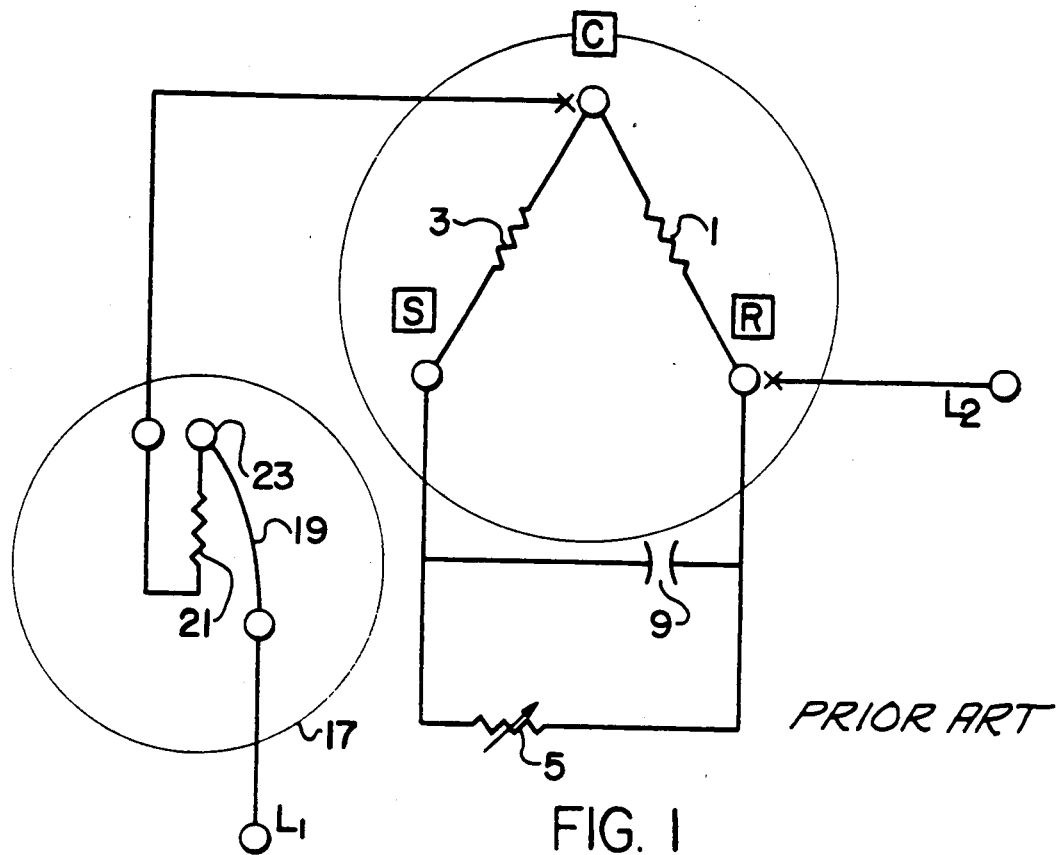
FIG. 1 is a circuit diagram of a motor winding system in accordance with the prior art.

Referring first to FIG. 1, there is shown a motor winding system in accordance with the prior art. The circuit includes a power source indicated by lines L1 and L2. Incoming current passes through an overload motor protector circuit 17 which includes a bimetallic element 19 and a heater 21. When a combination of ambient temperature and excessive motor current passing through heater 21 and bimetallic element 19 raise bimetallic element 19 to a predetermined temperature, the bimetallic element 19 will move away from the contact 23 to provide an open circuit between the bimetallic element and the heater, thereby opening the circuit to the motor windings. The motor winding system includes standard run winding 1 and start winding 3 with a parallel circuit of PTC resistor 5 and capacitor 9 in series with the start winding 3.

Figure 2:
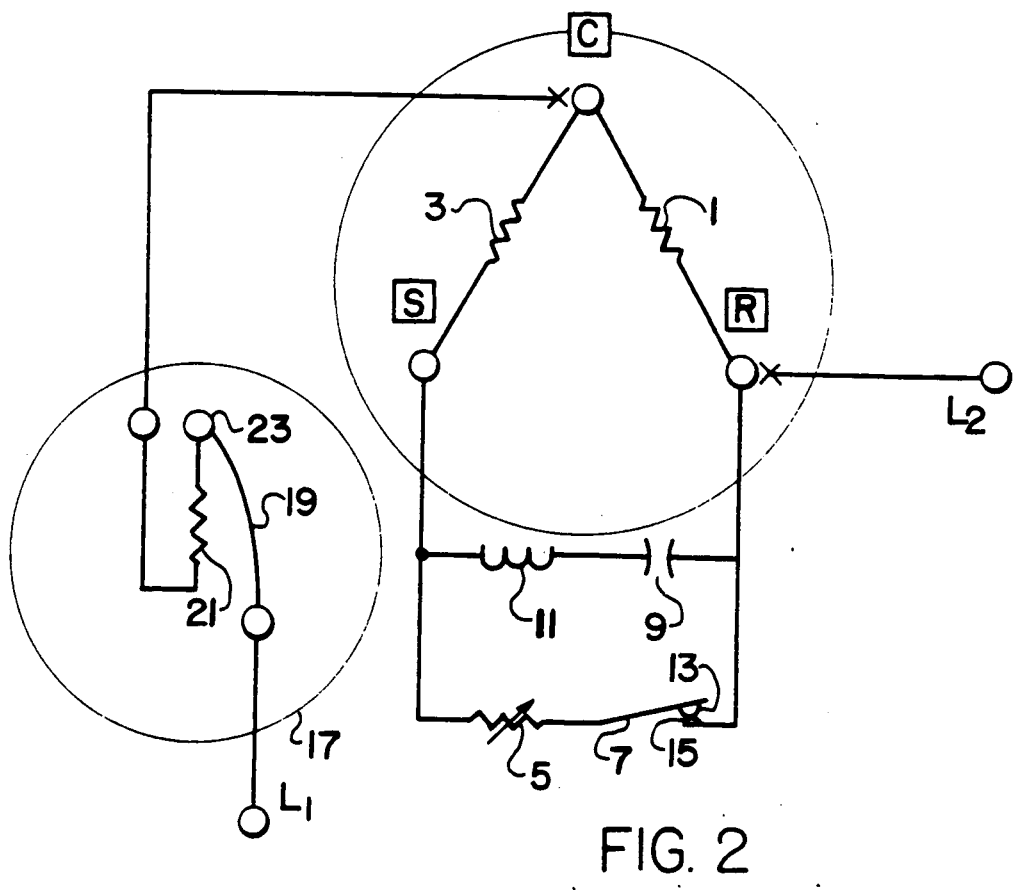
FIG. 2 is a circuit diagram of a motor start system in accordance with the present invention.

Referring now to FIG. 2, there is shown a motor winding system in accordance with the present invention wherein like elements as in FIG. 1 have like reference designations. The system includes the same motor protector circuit 17 described with reference to FIG. 1 as well as a main winding 1 connected across a power line L1 and L2. Connected in parallel with the main winding 1 is a start motor circuit including serially connected start/auxiliary winding 3, PTC resistor 5 and normally closed bimetallic switch element 7 which contacts a contact element 15 with a contact element 13 thereon. Connected in parallel with the PTC resistor 5 and bimetallic switch element 7 is a series circuit comprising a capacitor 9 and an electromagnet 11 which acts as a holding magnet for the bimetallic switch element 7 as will be explained hereinbelow.

In operation, upon motor start up, a voltage is applied across the power lines L1 and L2 to apply current to both the main winding 1 and the start/auxiliary winding 3. A portion of the current through the start winding 3 will pass through the PTC resistor 5, the contact element 15 and the contact element 13 on bimetallic switch element 7, causing the PTC resistor to heat up and provide increased resistance to the start motor circuit. Also, the current passing through the bimetallic switch element 7 causes heating therein. At some predetermined temperature, designed in known manner into the bimetallic switch element 7 and related to the motor to be controlled, the element 7 and contact element 13 thereon will move away from the contact element 15 and open the circuit through the PTC resistor 5.

Meanwhile, another portion of the current through the start winding which is a relatively very low current constantly passes through the capacitor 9 and the winding of the holding electromagnet 11 to energize the electromagnet. The electromagnet is designed to have insufficient magnetic attraction to attract the bimetallic switch element 7 thereto when the switch formed by the bimetallic switch element and contact elements 13 and 15 is closed. However, as the bimetallic switch element 7 moves toward the electromagnet 11, either gradually or by snap action, it is ultimately attracted to the electromagnet and latches thereto. Accordingly, the circuit through the PTC resistor 5 remains open and remains in that state until the bimetallic switch element 7 returns to the closed switch condition. This can only happen when current to the electromagnet 11 is removed, primarily by turning off the motor.

It can be seen that the above described motor winding circuit provides the dual advantages of decreasing heat generated by the motor start winding system as well as providing increased motor system efficiency as compared with prior art systems.

In accordance with a second embodiment of the invention, in low power motor starters, the switch, 7 of FIG. 2 can be replaced with a switch as defined above. In this embodiment, as the motor speed increases after start and the PTC element 5 heats up due to the passage of current therethrough, the resistance of the PTC element increases to cause a decrease in current therethrough. Accordingly, the current through the capacitor 9 and relay coil or electromagnet 11 will increase, thereby increasing the magnetic field strength provided by the electromagnet and causing the non-thermostatic switch 7 to open. The switch 7 will remain open as long as sufficient current is passing through the coil 11 to perform this function.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A motor system having a start winding and a main winding, comprising:
   (a) a first and a second circuit connected in parallel to form a parallel circuit, said parallel circuit serially connected to said start winding;
   (b) said first circuit including a resistor having a defined temperature coefficient of resistance and a temperature responsive switch in series therewith;
   (c) said second circuit including an electromagnetic device for latching said switch in a predetermined state and a capacitor in series therewith.

2. A system as set forth in claim 1 wherein said resistor has a positive temperature coefficient of resistance.

3. A system as set forth in claim 1 wherein said temperature responsive switch is a normally closed bimetallic switch.

4. A system as set forth in claim 2 wherein said temperature responsive switch is a normally closed bimetallic switch.

5. A system as set forth in claim 3 wherein said electromagnetic device is responsive to predetermined movement of said bimetallic switch to latch said switch in the open state.

6. A system as set forth in claim 4 wherein said electromagnetic device is responsive to predetermined movement of said bimetallic switch to latch said switch in the open state.

7. A system as set forth in claim 3 wherein said bimetallic switch comprises a pair of contacts and a bimetallic element carrying one of said contacts.

8. A system as set forth in claim 4 wherein said bimetallic switch comprises a pair of contacts and a bimetallic element carrying one of said contacts.

9. A system as set forth in claim 5 wherein said bimetallic switch comprises a pair of contacts and a bimetallic element carrying one of said contacts.

10. A system as set forth in claim 6 wherein said bimetallic switch comprises a pair of contact and a bimetallic element carrying one of said contacts.

11. A system as set forth in claim 7 wherein said bimetallic element is a snap acting element.

12. A system as set forth in claim 8 wherein said bimetallic element is a snap acting element.

13. A system as set forth in claim 9 wherein said bimetallic element is a snap acting element.

14. A system as set forth in claim 10 wherein said bimetallic element is a snap acting element.

15. A motor system having a start winding and a main winding, comprising:
   (a) a first and a second circuit connected in parallel to form a parallel circuit, said parallel circuit serially connected between to said start winding and said main winding;
   (b) said first circuit including a resistor having a defined temperature coefficient of resistance and, in its unactuated condition, a normally closed switch in series therewith;
   (c) said second circuit including an electromagnetic device for opening said switch and a capacitor in series therewith.

16. A system as set forth in claim 15 wherein said switch is a normally closed non-thermostatic switch.

17. A system as set forth in claim 15 wherein said resistor has a positive temperature coefficient of resistance.

18. A system as set forth in claim 17 wherein said switch is a normally closed non-thermostatic switch.

19. A motor system comprising:
   (a) a power source having first and second terminals;
   (b) a start winding circuit and a main winding connected in parallel across said first and second terminals of said power source, said start winding circuit comprising:
   (c) a start winding coupled to said first terminal;
   (d) a first and a second circuit connected in parallel to form a parallel circuit, said parallel circuit serially connected to said start winding and to said second terminal;
   (e) said first circuit including a resistor having a positive temperature coefficient of resistance and a normally closed temperature responsive switch in series therewith;
   (f) said second circuit including a capacitor and an electromagnetic latching device for latching said switch in the open condition responsive to predetermined movement of said switch.

20. A system as set forth in claim 19 wherein said switch comprises a pair of contact members and a bimetallic element movable in response to predetermined temperature change, one of said contact members being disposed on and movable with said bimetallic element.

21. A motor starting system comprising:
   (a) a first and a second circuit connected in parallel to form a parallel circuit, means to serially connect said parallel circuit to a start winding of a motor;
   (b) said first circuit including a resistor having a defined temperature coefficient of resistance and a temperature responsive switch in series therewith;
   (c) said second circuit including an electromagnetic device for latching said switch in a predetermined state and a capacitor in series therewith.

22. A system as set forth in claim 21 wherein said resistor has a positive temperature coefficient of resistance.

23. A system as set forth in claim 21 wherein said temperature responsive switch is a normally closed bimetallic switch.

24. A system as set forth in claim 23 wherein said electromagnetic device is responsive to predetermined movement of said bimetallic switch to latch said switch in the open state.

25. A system as set forth in claim 24 wherein said bimetallic element is a snap acting element.

26. A motor starting system comprising:
   (a) a first and a second circuit connected in parallel to form a parallel circuit, means to serially connect said parallel circuit between a start winding and a main winding of a motor;
   (b) said first circuit including a resistor having a defined temperature coefficient of resistance and, in its unactuated condition, a normally closed switch in series therewith;
   (c) said second circuit including an electromagnetic device for opening said switch and a capacitor in series therewith.

27. A system as set forth in claim 26 wherein said switch is a normally closed non-thermostatic switch.

28. A system as set forth in claim 26 wherein said resistor has a positive temperature coefficient of resistance.

* * * * *